(12) United States Patent
Kempén (10) Patent No.: US 9,374,328 B1
(45) Date of Patent: Jun. 21, 2016

(54) SELECTIVE MESSAGING USING ONLINE PRESENCE INFORMATION

(75) Inventor: Björn Kempén, Bromma (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/347,852

(22) Filed: Jan. 11, 2012

(51) Int. Cl.
*H04L 12/58* (2006.01)
*H04L 29/08* (2006.01)

(52) U.S. Cl.
CPC ............ *H04L 51/043* (2013.01); *H04L 67/104* (2013.01)

(58) Field of Classification Search
CPC ........ H04L 51/04; H04L 51/14; H04L 12/281
USPC ........................................................ 706/206
See application file for complete search history.

(56) References Cited

U.S. PATENT DOCUMENTS

| | | | |
|---|---|---|---|
| 6,549,937 B1 * | 4/2003 | Auerbach et al. ............. | 709/206 |
| 7,984,102 B1 * | 7/2011 | Raphel et al. ................. | 709/206 |
| 8,107,941 B2 * | 1/2012 | Klassen ......................... | 455/418 |
| 2003/0120732 A1 * | 6/2003 | Couts et al. ................... | 709/206 |
| 2004/0054729 A1 * | 3/2004 | Fukuizumi et al. ........... | 709/205 |
| 2004/0177111 A1 * | 9/2004 | Vincent et al. ................ | 709/203 |
| 2006/0095530 A1 * | 5/2006 | Daniell et al. ................ | 709/206 |
| 2006/0259956 A1 * | 11/2006 | Diacakis et al. ................. | 726/2 |
| 2008/0201437 A1 | 8/2008 | Ludwig et al. | |
| 2010/0159883 A1 * | 6/2010 | Pascal et al. ............... | 455/412.1 |
| 2010/0262664 A1 * | 10/2010 | Brown .................. | H04L 47/323 709/206 |
| 2011/0271202 A1 * | 11/2011 | Wong ..................... | G06Q 10/10 715/752 |
| 2011/0302253 A1 * | 12/2011 | Simpson-Anderson ............... | H04L 51/04 709/206 |
| 2012/0300698 A1 * | 11/2012 | Lindner et al. ................ | 370/328 |
| 2014/0223333 A1 * | 8/2014 | Pegg et al. ..................... | 715/753 |

OTHER PUBLICATIONS

M. Day, Lotus, J. Rosenberg, dynamicsoft, H. Sugano, Fujitsu, "A Model for Presence and Instant Messaging", Network Working Group, Request for Comments: 2778, Feb. 2000, 1-16.*
Andrei Broder, Michael Mitzenmacher, "Network Applications of Bloom Filters: A Survey," Internet Mathematics, vol. 1, No. 4: 485-509.*
Jeff Tyson, HOw OSI works, 2000, p. 1-3.*
Roychowdhury et al.; Instant Messaging and Presence for SIP Enabled Networked Appliances; Proceedings of Internet Telephony Workshop; Apr. 2-3, 2001.

* cited by examiner

*Primary Examiner* — Anthony Mejia
*Assistant Examiner* — Joseph M Cousins
(74) *Attorney, Agent, or Firm* — Shumaker & Sieffert, P.A.

(57) ABSTRACT

Described herein are devices and techniques for automatically determining in a presence-enabled messaging service, the presence status of at least one subscriber identified in a user's list of user contacts, and for filtering subsequent transmission of related network messages (packets) responsive to each user contact's presence status. In preparation for the real-time text exchange between such messaging (e.g., IM or chat) subscribers, an initializing user requests presence status for all user contacts. An association of presence status formed in response to replies to the user probe. Such associations can be stored as a data structure, such as a Bloom filter, a hash table, a list, or the like. Subsequent presence messages (e.g., broadcasts, probes) from the initialized user are filtered, in response to the associated contact status. For example, subsequent presence messages are only sent to those user contacts believed to be online.

18 Claims, 6 Drawing Sheets

PRIOR ART

FIG. 3B

PRIOR ART

SELECTIVE MESSAGING USING ONLINE PRESENCE INFORMATION

TECHNICAL FIELD

This application relates generally to the field of communications. More particularly, this application relates to the technology of presence-enabled network services.

BACKGROUND

A special class of networked services allowing for the bi-directional exchange of generally text-based messages occurring in real-time is sometimes referred to as online chat or instant messaging (IM). Such forms of communication can operate in push mode between two or more individuals (users) using network-enabled communication devices, such as personal computers, smart phones or other devices, along with shared clients. A user's text is conveyed over a network, such as the Internet, to one or more other subscribed users. More advanced instant messaging software clients also allow enhanced modes of communication, such as live voice or video calling and inclusion of links to media.

Subscribers of such services, also referred to as users, generally establish a listing of other subscribers with whom they may choose to participate in such real-time messaging exchanges. Such other subscribers in reference to any given user can be referred to as the user's friends or contacts. Considering the real-time nature of the message exchange, it is beneficial for each user to know beforehand whether a particular friend or group of friends is online and otherwise available to participate in a real-time message exchange. To facilitate such communications, each user's state of availability can be summarized by a presence status indicator. Particular presence status indicators can vary, for example, from simplistic "present" (i.e., online) and "not present" (i.e., not online), to more sophisticated, such as: "online"; "offline"; "busy" and "away." Accordingly, there exists a need to retain each user's presence status indicator, such that it is available to any given user choosing to engage in such real-time messaging. Such information can be retained, for example, in a centralized network location and kept up to date such that each of the users can consult the centralized presence status to determine the status of any other user (friend).

In some presence enabled network services, however, no central state is provided regarding the presence status of users. With such networks, it is generally necessary to maintain network connectivity (e.g., a full mesh) between the networked users to allow presence information to be exchanged between them in order that each user is kept up to date as to the presence status of other subscribed users (contacts). Whenever a user in the network graph updates its presence state, it is necessary to broadcast an indication of the updated state to all other users he/she is subscribed to. For users with a large subscription list, such means of updating presence status is an expensive operation, which produces significant amounts of network traffic.

In such scenarios, presence status of any give user is broadcast to all of that user's contacts, without regard to any of the contact's presence status. Consequently, presence status messages are often sent to users who are not online, such that a lot of these packets are never handled on the receiving side. Such an approach leads to unnecessary allocation of network resources, at least in terms of bandwidth consumption.

SUMMARY

It would be desirable to avoid sending presence messages to any users that are not online in order to preserve network resources (e.g., bandwidth). It would also be desirable to automatically determine which presence status messages (packets) need to be delivered, and which do not based on the presence status of the intended recipients.

Described herein are devices and techniques for automatically determining presence status of subscribed users in a presence-enabled messaging service, and for filtering the exchange of related network messages (packets) responsive to each recipient's presence status.

In one aspect, at least one embodiment described herein provides a process for real-time text exchange between a number of IM subscribers. The process includes broadcasting upon initiation, personal presence status for a number of IM subscribers. Respective presence status is requested from at least one IM subscriber of the number of IM subscribers. Presence status is received from at least one IM subscriber of the number of IM subscribers. A respective presence status is associated with at least one IM subscriber of the number of IM subscribers, based on a response or a non-response to the presence status request. Subsequent personal presence status is selectively broadcast to the number of IM subscribers responsive to the respective presence status associated with at least one IM subscriber of the number of IM subscribers.

In another aspect, at least one embodiment described herein provides a system for selectively broadcasting personal presence status to a number of instant messaging (IM) subscribers. The system includes a number of IM clients, in which each IM client is associated with a respective IM subscriber of the number of IM subscribers. The system also includes a number of IM servers, for which each IM server is in communication with a respective IM client of the number of IM clients. A respective memory is provided in communication with each IM server of the number of IM servers. A respective presence manager is also provided in communication with each IM server of the number of IM servers. The respective presence manager stores in the respective memory an associated presence status of other IM subscribers of the number of IM subscribers. In some embodiments, the IM server broadcasts messages responsive to each subscriber's associated presence status.

In yet another aspect, at least one embodiment described herein provides a system for selectively broadcasting personal presence status to a number of instant messaging (IM) subscribers. The system includes means for broadcasting upon initiation, personal presence status for a number of IM subscribers. Also provided are means for requesting upon initiation, respective presence status from at least one IM subscriber of the number of IM subscribers. The system further includes means for associating with at least one IM subscriber of the number of IM subscribers, a respective presence status obtained in response to the presence status request. Means for selectively broadcasting subsequent personal presence status for the number of IM subscribers are also provided responsive to the respective presence status associated with at least one IM subscriber of the number of IM subscribers.

BRIEF DESCRIPTION OF THE DRAWINGS

The present application is further described in the detailed description which follows, in reference to the noted plurality of drawings by way of non-limiting examples of embodiments, in which like reference numerals represent similar parts throughout the several views of the drawings, and wherein.

DETAILED DESCRIPTION

In the following detailed description, reference is made to accompanying drawings, which form a part thereof, and within which are shown by way of illustration, specific embodiments, by which the techniques described herein may be practiced. It is to be understood that other embodiments may be utilized and structural changes may be made without departing from the scope of the claimed invention.

The particulars shown herein are by way of example and for purposes of illustrative discussion of the embodiments of the present application only and are presented in the case of providing what is believed to be the most useful and readily understood description of the principles and conceptual aspects of the present application. In this regard, no attempt is made to show structural details of the various embodiments in more detail than is necessary for the fundamental understanding of the present application, the description taken with the drawings making apparent to those skilled in that how the several forms of the present application may be embodied in practice. Further, like reference numbers and designations in the various drawings indicate like elements.

Described herein are devices and techniques in a presence-enabled network service for filtering or otherwise restricting networked communications responsive to predetermined presence status. For each subscriber of the presence-enabled network serviced, a presence status is determined for all subscribed entities. Having established such presence status, messages related to presence status are only sent to those subscribed entities having a preferred presence status.

Figure 1:
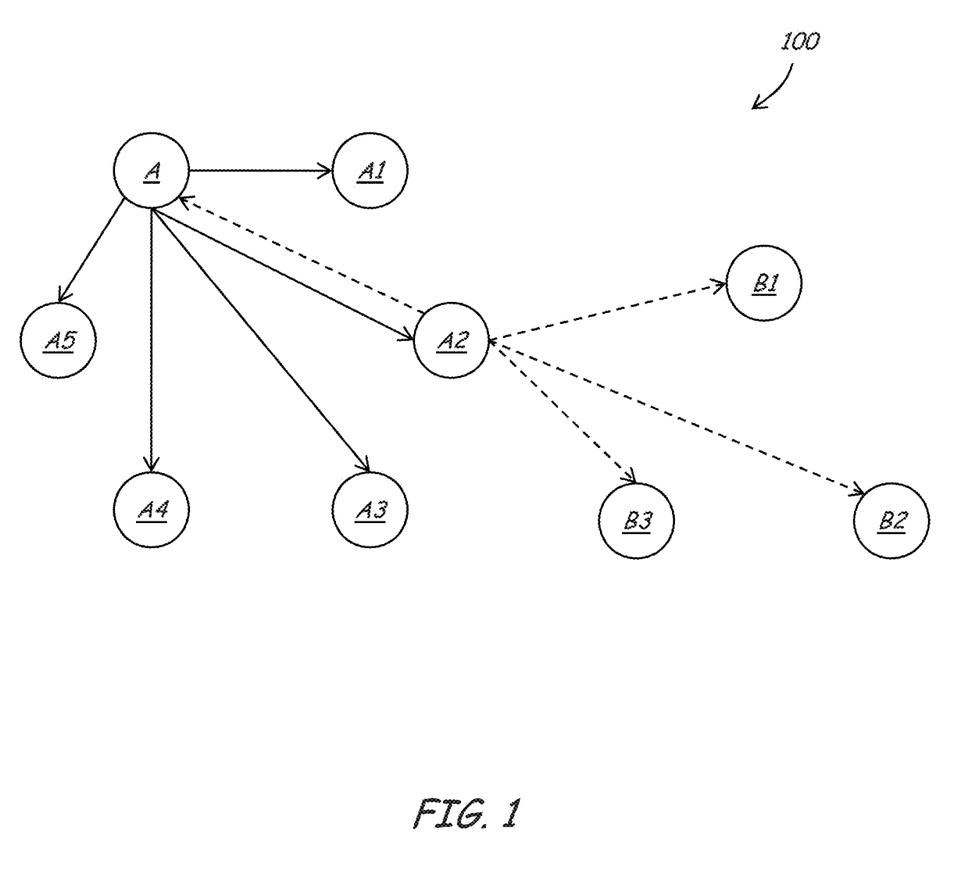
FIG. 1 shows a schematic diagram of an example of a portion of a subscriber network graph.

FIG. 1 shows a schematic diagram of an example of a portion of a presence-enabled subscriber network graph 100. In the illustrative example, subscriber A (user A) has subscribed for a presence-enabled networked service to fellow subscribers A1, A2, A3, A4 and A5 (i.e., Friends A1-A5). In at least some embodiments, the networked service is a real-time messaging service, such as instant messaging (IM), or chat. User A's friends A1-A5 are also users of the presence-enabled networked services, with each friend similarly having its own list of fellow subscribers. By way of example, User A's friend A2, is also a user with subscribers (friends) A, B1, B2 and B3. Each of the subscribers represents another user generally having an associated number of subscribers.

The lines connecting each of the users with a respective subscriber represent network connectivity. Thus, under the presence-enabled networked service, user A has network connectivity with each of friends A1-A5. Likewise, each of User A's friends A1-A5 has connectivity with a respective collection of other subscribers. Such a mapping of network connectivity between subscribers and subscribed entities can be referred to as a network graph.

Figure 2:
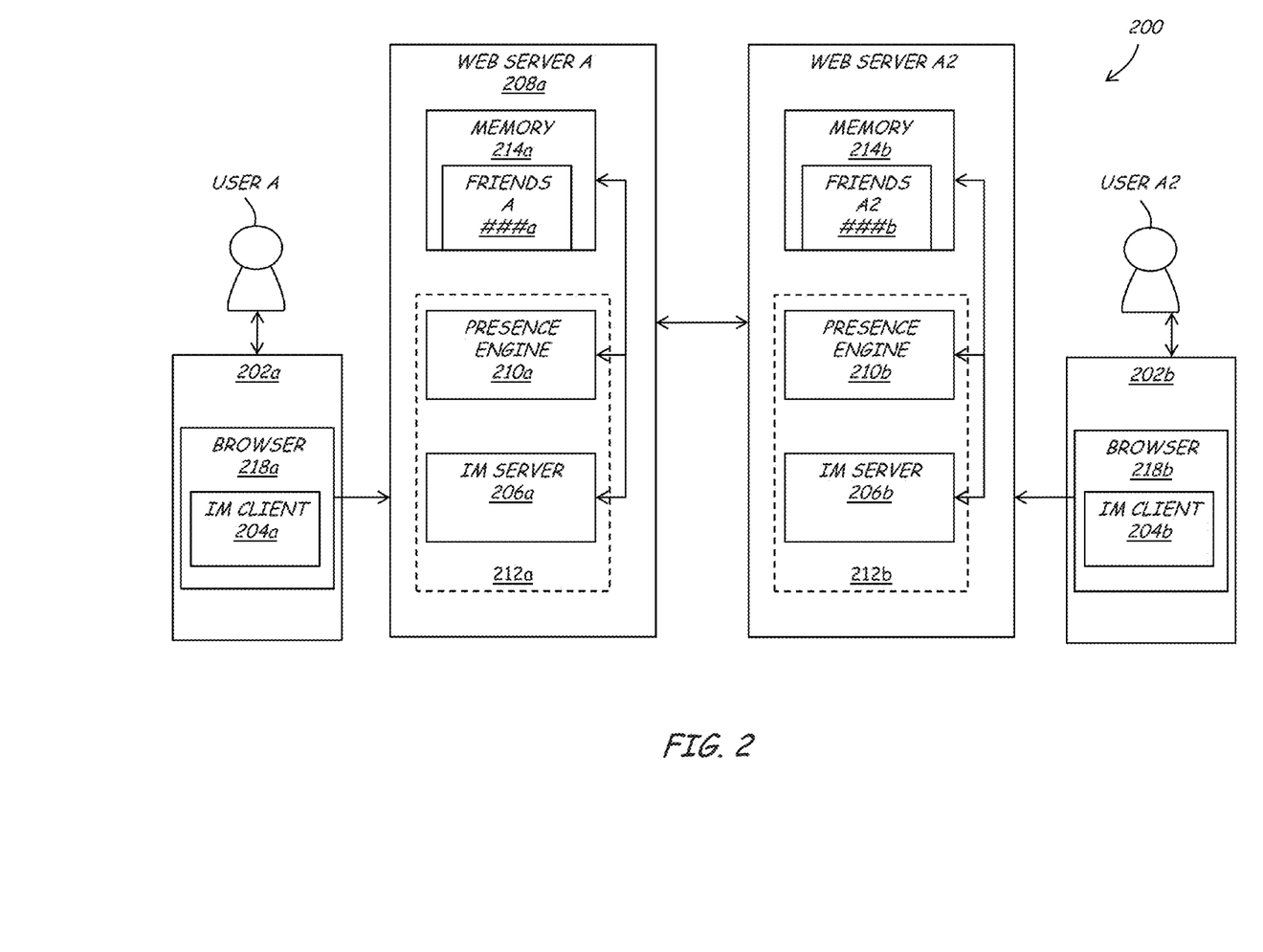
FIG. 2 shows a functional block diagram of an embodiment of a portion of a presence-enabled network.

FIG. 2 shows a functional block diagram of an embodiment of a portion of a presence-enabled network 200. In the example embodiment, User A and User A2 accesses the presence-enabled networked service through a network-enabled communication device 202a, 202b (generally 202), such as a personal computer, smart phone or other device. For example, in a client-server implementation, a first user's communication device 202a runs a client application 204a that communicates cooperatively with a respective server application 206a hosted on another platform, such as a respective web or back-end server 208a. Another user's communication device 202b similarly runs a respective client application 204b that communicates cooperatively with a respective server application 206b hosted on another platform, such as another back-end server 208b. Each of the back-end servers 208a, 208b are in networked communication with each other through any suitable network, such as the Internet, local area network, wide area network, or combinations thereof.

In the illustrative example, each of the web servers 208a, 208b (generally 208) includes a respective presence-enabled messaging server, such as the IM server 206a, 206b shown. The web servers 208 can include one or more processors configured to execute pre-programmed instructions. For examples, the web servers 208 can be implemented as a stand-alone server, a workstation, a personal computer, or the like. One or more of the web servers 208 include at least one respective operating system, such as UNIX, MAC-OS or Windows. The web servers 208 include a network stack for engaging in one or more forms of networked communications with clients 202 and other web servers 208. In at least some embodiments, each user accesses the presence-enabled network service through a respective web server, as shown. Alternatively or in addition, it is conceivable that at least some of the users can access the same web server.

Each of the web servers 208a, 208b also includes a respective presence manager or engine 210a, 210b for cooperatively establishing and maintaining presence status among subscribers. Each of the presence engines 210a, 210b can be an independent module as shown, or combined together with the presence-enabled (e.g., IM) server as suggested by the dashed box 212a, 212b. Each of the web servers 208a, 208b also includes access to respective electronic storage. For example, each of the web servers 208a, 208b includes a respective electronically readable memory 214a, 214b (generally 214). The electronically readable memory 214 can be a hard disk, a read only memory (ROM), a random access memory (RAM), optical storage media, such as a CD-ROM, networked storage, such as provided by cloud service, and the like.

An instant messaging client 204 is a software application that enables the user to engage in instant messaging. Instant messaging clients 204 utilize one or more instant messaging protocols. Some example IM protocols include OSCAR (AIM, ICQ), XMPP, IRC, MSNP (Windows Live Messenger), and Skype. At least some instant messaging clients also include other capabilities, such as Voice over Internet Protocol (VOIP) and videoconferencing. In at least some embodiments, one or more of the clients 204 access presence-enabled network service through a respective web-browser 218a, 218b.

Figure 3A:
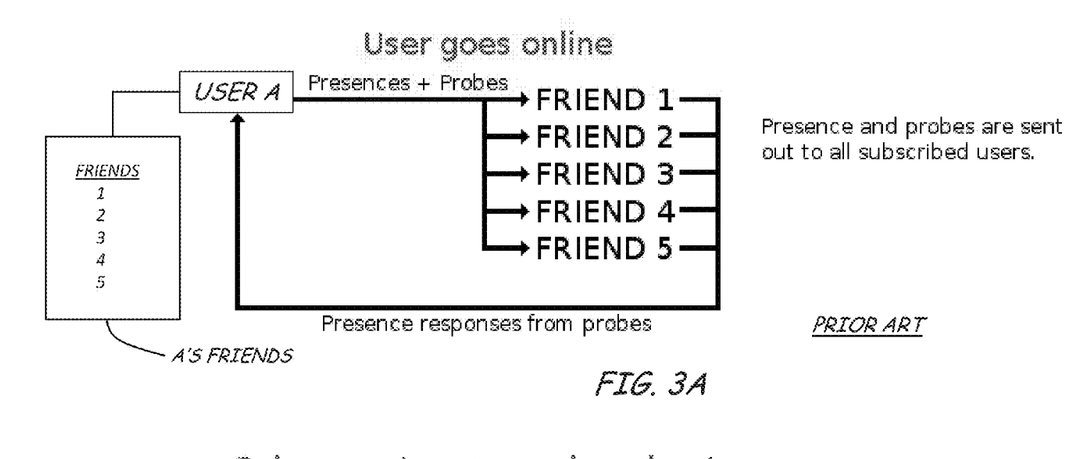
FIGS. 3A and 3B show functional block diagrams of an example of a subscriber presence update in a prior art presence-enabled network.
Figure 3B:
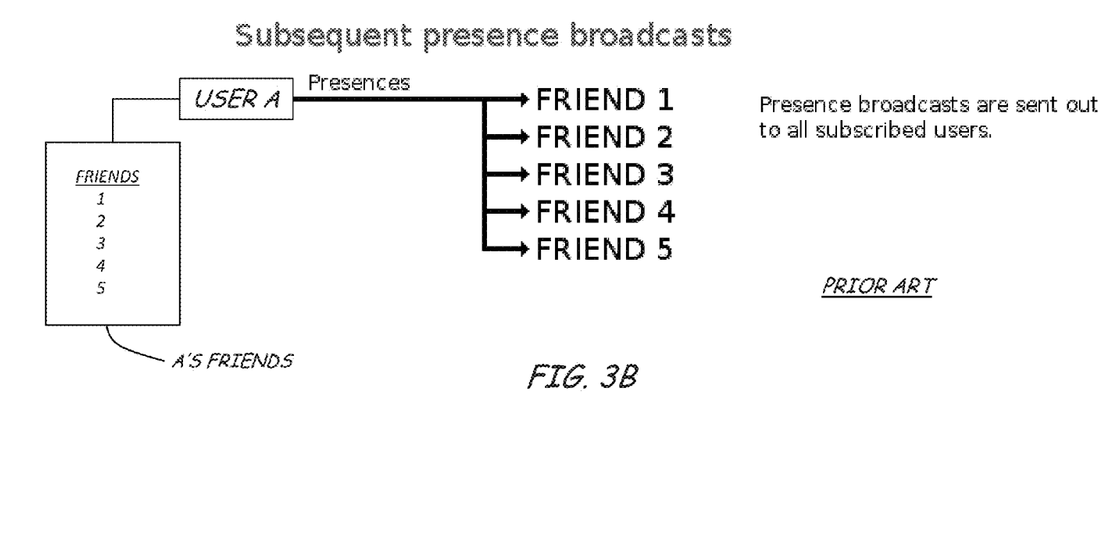

FIGS. 3A and 3B show functional block diagrams of an example of a subscriber presence update in a prior art presence-enabled network. In the illustrative example, User A is a subscriber of a presence-enabled networked service, such as IM or chat. In particular, User A has subscribed to five subscribed entities, contacts or friends, under this service. A record of User A's subscribed friends is retained, for example, in an electronically readable memory accessible by the networked service. Such an electronically readable memory can be maintained at one or more of the client 202 and the web server 208 (FIG. 2). Upon User A's initialization, as would occur by User A establishing an online presence (e.g., going on line), User A provides a presence status update to all of User A's friends (i.e., Friends 1 through 5, as indicated). The presence update can consist of a message broadcast or otherwise directed to each of User A's five friends. In order to establish a sense of the presence status of User A's friends, User A also sends a probe message to each of his/her friends requesting in return an indication of each friend's presence status (e.g., online, offline, away, busy). The returned presence status can be accessed by User A, for example through a networked service client application, allowing User A to determine a presence status of each friend.

As may occur during normal operation under the networked service, User A provides one or more presence status updates to User A's friends. Such updates can be provided in response to probe messages received from User A's friends, and/or unsolicited, in response to action or inaction of User A. For example, if User A is online, but inactive for a predetermined period of time, a message providing a corresponding indication of presence status (e.g., "away") can be broadcast to each of User A's friends as shown in FIG. 3B. It is important to observe that in the prior art scenario, User A determines recipients of such presence status updates from User A's record of subscribed friends, without regard to the presence status of any of the subscribed friends. Thus, if any of User A's friends happen to be off line (whether they were originally online upon initialization of User A, or not), User A still broadcasts a presence status message to any such offline friends. Such messages are not handled on a receive end, as the intended recipient is off line. Accordingly, such messages represented an unnecessary allocation of network resources (e.g., bandwidth).

Figure 4A:
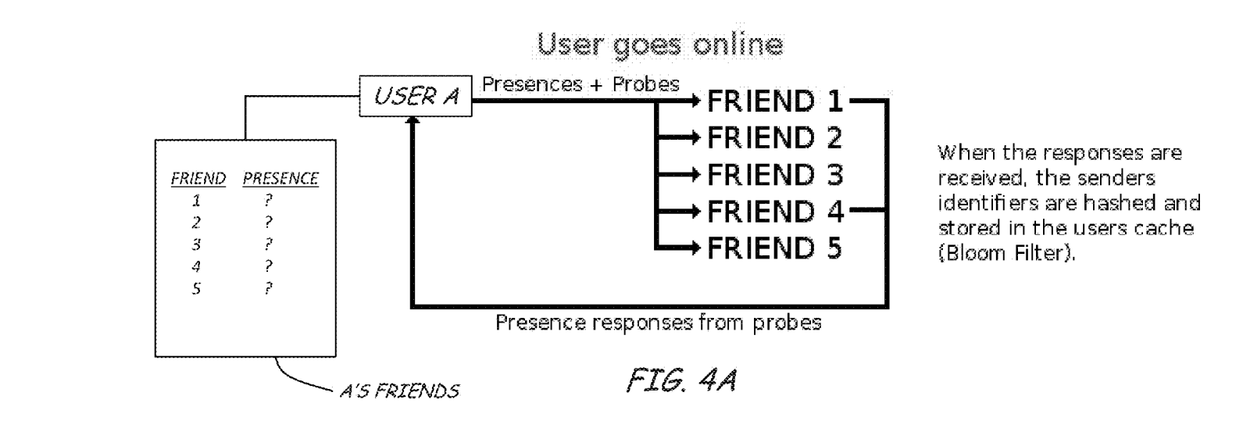
FIGS. 4A and 4B show functional block diagrams of an example of a subscriber presence update in an embodiment of a presence-enabled network with presence filtering.
Figure 4B:
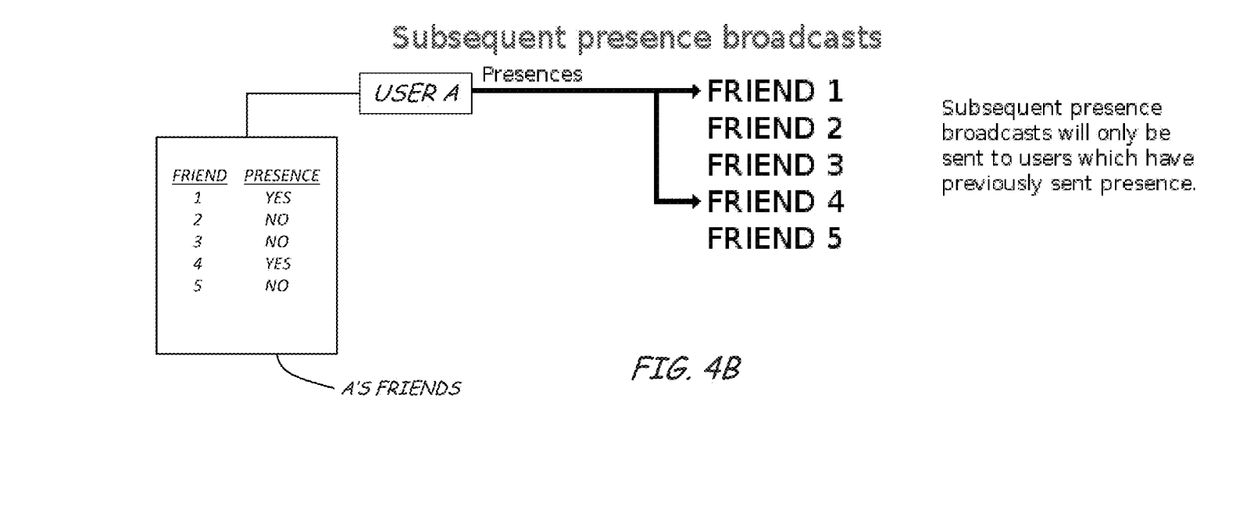

FIGS. 4A and 4B show functional block diagrams of an example of a subscriber presence update for User A, subscribed to the same five friends, but in an embodiment of a presence-enabled network equipped with a presence-status filtering capability. As in the previous example, User A has subscribed to five friends under the service. A record of User A's subscribed friends is retained, for example, in a memory accessible by the networked service. Upon User A's initialization, as would occur upon User A's establishing an online presence (i.e., going on line), User A provides a presence status update to all of User A's friends (i.e., Friends 1 through 5, as indicated). For instances in which the presence status of each of User A's friends is unknown, as would generally be the case upon initialization, User A directs the message to all of the subscribed friends, as indicated. As in the previous example, User A also sends a probe message to each of his/her subscribed friends requesting in return an indication of each friend's presence status (e.g., online, offline, away, busy). Each friend who happens to be online and receiving User A's probe message, generates a probe reply indicating the presence status of the probed subscriber. In at least some embodiments in inference of presence status can be drawn (e.g., "offline") upon a failure to receive a reply from one or more of the probed subscriber (e.g., within a timeout period). Such probe reply messages are ultimately returned via the network to User A. An association is created between each of User A's friends and their respective presence status as discerned from replies to User A's probe message. The association is accessible to one or more of User A's client 202a and web server IM server 206a (FIG. 2).

In at least some embodiments associations of a user's friend's presence status are retained in the electronically readable memory 214a. Similar associations can be stored on respective web servers 208 for other users of the presence-enabled network service. Such associations can be retained, for example, in a cache. In at least some embodiments, the cache is constructed using a Bloom filter. A Bloom filter generally has a constant size, providing a space-efficient storage of hashed user identifiers. A Bloom filter approach does have a minor drawback in that false positives might occur during a user lookup. Such a false positive would result in a message being sent to an offline user. As this would occur infrequently, if at all, it would still represent a dramatic improvement to the utilization of network resources for presence-enabled network services.

In implementing a Bloom filter approach, the memory allocation size is determined by the number of user contacts, corresponding to a number of connected nodes in the mesh network. Whenever a connected user in the network receives presence from another user, it hashes the identifier of that user and adds the hashed identifier into the cache construct. A hash algorithm can be used to associate or otherwise assigns a value, sometimes referred to as a signature or a hash, to an object, such as a user identifier, sometimes referred to as a key. Such hashed values can be stored in a hash table. Other approaches apply checksum functions to objects to produce checksum values. Whenever a user goes online initially, the user sends out a broadcast of presence messages to all of his/her subscribed users, and also request their presence through a "probe." The user then receives presence responses from all online and subscribed users, which triggers them to be added to the cache construct.

Whenever a subsequent presence broadcast is triggered, for example, from a user, the user iterates through its list of subscribed users, and for each one perform a cache lookup. Presence stanzas are only sent out to other users that appear present in the cache construct.

In some embodiments, a state of online users can be maintained in other data structures, such as a list or a hash set. Such alternative approaches can be used to avoid the occurrence of false positives. Unfortunately, however, such alternative structures may also grow significantly larger, since the list or set size will be dependent on the number of online users, while the Bloom Filter size will always be constant after creation.

Alternatively or in addition, a large distributed hash table can be provided with mappings between user identifiers and their current presence state. Such an approach is viable, but will add additional complexity into the system, since the hash table must be kept synchronized with the actual states of all endpoints in the network.

Having established an association between friends and presence status, User A filters subsequent presence status broadcast messages, for example, informing User A's friends as to any changes in User A's status. Such broadcast messages can be generated by the respective presence engine 210a, for example, responsive to the associated user's presence status as determined by the presence engine 210a, or otherwise reported by the IM client 204a. For example, in some embodiments User A broadcasts presence status updates only to those friends not having an off-line (i.e., not present) status. In this example, broadcast presence status updates are broadcast to those friends having an associated status of online, busy and away, but not for those friends having an associated status of offline.

Continuing with the illustrative example, probe messages sent to all subscribed friends upon initialization (i.e., Friend 1 through Friend 5), resulted in responses only from those users present at the time the probe message was sent. In the illustrative example, only Friend 1 and Friend 4 provide responses to User A's probe message. The responses confirm that Friends 1 and 4 are present. After a predetermined period of time, User A can infer from a lack of responses from the remaining Friends (i.e., Friends 2-3 and 5), that their respective presence status is not present (i.e., offline). One or more of the IM client 204a, the IM server 206a and the presence engine 210a updates an association of presence status with each of User A's subscribed friends. As illustrated, Friends 1 and 4 are associated with an online presence status; whereas, Friends 2-3 and 5 are associated with an offline presence status.

Having established an association of presence status with each of the subscribed friends, User A is able to filter subsequent broadcast messages to a select set of Friends, corresponding to their respective associated status. For example, subsequent presence broadcast messages (e.g., status broadcasts, probe requests) are sent only to those subscribed Friends not offline. Thus, in such an embodiment subsequent messages would only be only to Friends 1 and 4, thereby reducing the burden on network communications.

Figure 5:
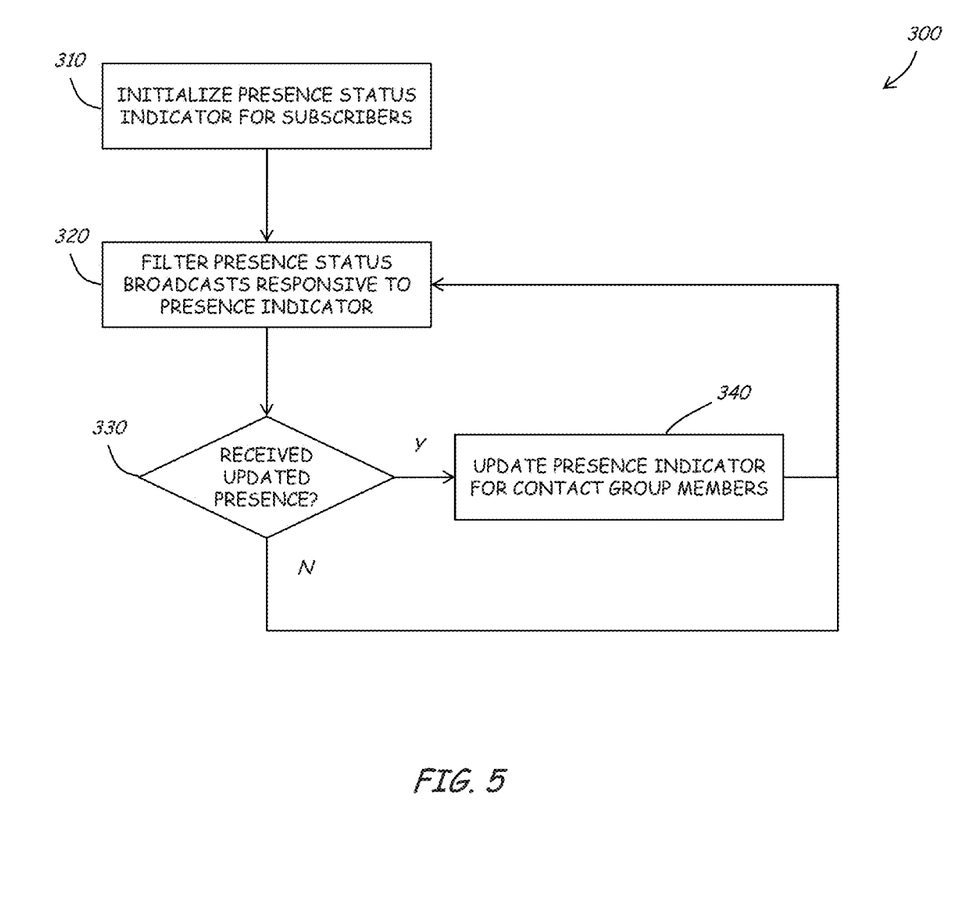
FIG. 5 shows a flowchart of an embodiment of a process for efficiently managing presence information in IM networks.

FIG. 5 shows a flowchart of an embodiment of a process 300 for efficiently managing presence information in a presence-enabled network service. A presence status indicator for a predetermined group of subscribers is initialized at 310. For example, the predetermined list of subscribers can be a user's list of IM friends or contacts. Presence broadcasts to the predetermined list of subscribers are subsequently filtered at 320 responsive to presence status indicators. In order to maintain an updated presence status, a user can periodically determine an updated presence status of each subscriber of the predetermined list of subscribers at 330. Such updated presence status can be responsive to probe messages sent by the user and/or unsolicited as in broadcast status messages sent by each of the subscribed users in response to a change in presence status. In response to concluding that an updated presence has been received, a respective presence indicator for the subscriber associated with the updated presence status is updated at 340. During periods of normal operation, the IM server 206a (FIG. 2) continues to filter presence status broadcasts responsive to the current presence status indicators.

Figure 6:
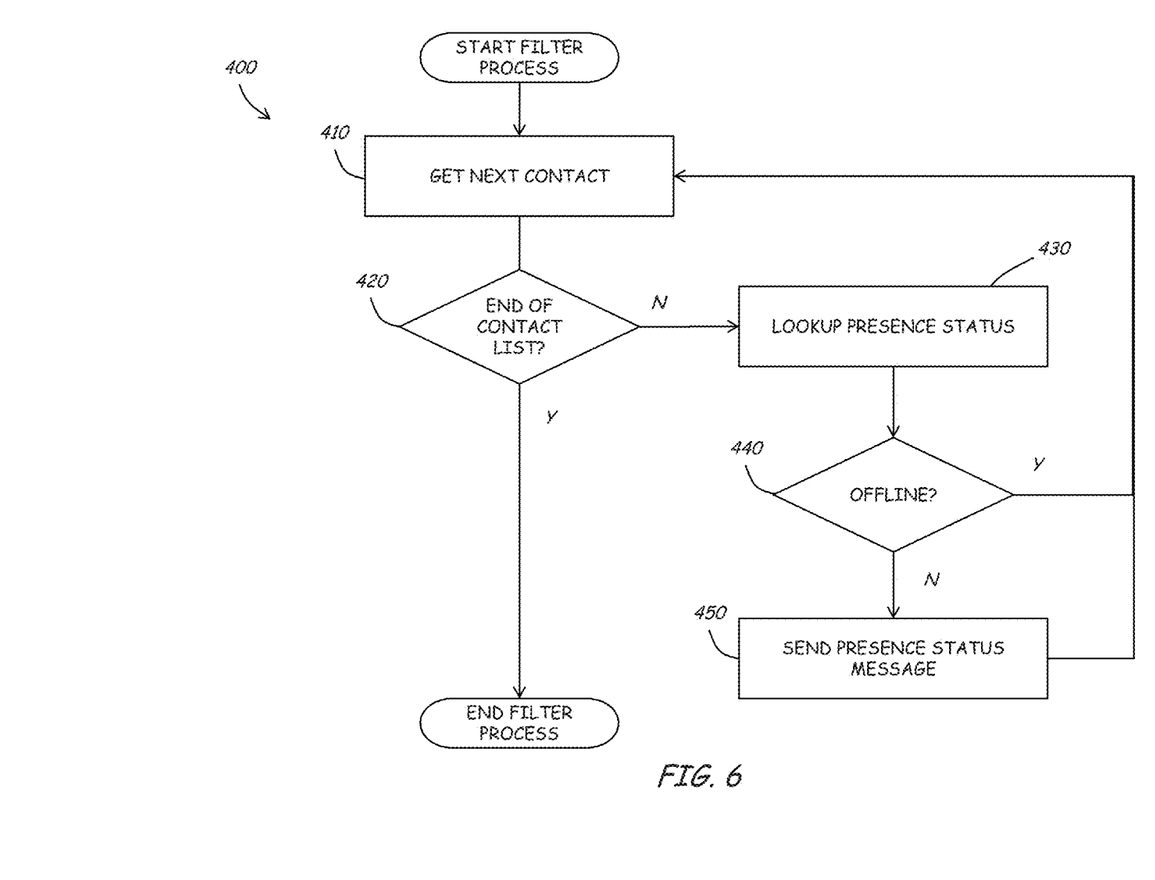
FIG. 6 shows a flowchart of an embodiment of a process for filtering presence status messages responsive to subscriber presence status.

FIG. 6 shows a flowchart of an embodiment of a process 400 for filtering presence status messages responsive to subscriber presence status. Such a process 400 can be implemented in a presence-enabled network service at each instance in which a subscriber intends to send messages, such as presence-status messages, to subscribed entities (e.g., a list of friends or user contacts). A respective listing of such user contacts is associated with each user as described above. Upon initiating a message, such as a presence status broadcast or probe, the process can be used to filter or otherwise determine the possible recipients of such messages.

In accordance with the example process 400, a first user contact is obtained from the user's user contact list at 410. In response to determining that the end of the user contact list has not been encountered at 420 (i.e., having identified the next user contact), a presence status of the user contact is determined at 430. Such presence status can be obtained from a predetermined association between each user contact and a respective presence status determined, for example, in response to a probe message as described above in reference to FIG. 5. If it is determined at 440 that the user contact is not offline (e.g., online, away or busy), then the message is forwarded to the intended user contact at 450. The process 400 repeats as a next user contact is obtained from the list of such contacts at 410. Had it been determined at 440 that the user contact was offline, the process 400 would have progressed to obtain the next user at 410, without sending any message to the offline user contact. The process 400 continues in such a manner for each subsequent user contact, until an end of user contact list is encountered at 420, upon which the message filter process terminates.

Whereas many alterations and modifications of the various embodiments will no doubt become apparent to a person of ordinary skill in the art after having read the foregoing description, it is to be understood that the particular embodiments shown and described by way of illustration are in no way intended to be considered limiting. Further, the application has been described with reference to particular embodiments, but variations within the spirit and scope of the application will occur to those skilled in the art. It is noted that the foregoing examples have been provided merely for the purpose of explanation and are in no way to be construed as limiting of the present application.

While the present application has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present application in its aspects.

Although the present application has been described herein with reference to particular means, materials and embodiments, the present application is not intended to be limited to the particulars disclosed herein; rather, the present application extends to all functionally equivalent structures, methods and uses, such as are within the scope of the appended claims.

We claim:

1. A method comprising:
   broadcasting a personal presence status from a first instant messaging subscriber to a plurality of instant messaging subscribers;
   sending, to the plurality of instant messaging subscribers, a request for respondent presence statuses;
   receiving at least one respondent presence status from at least one instant messaging subscriber from the plurality of instant messaging subscribers;
   creating an association between the first instant messaging subscriber and the at least one instant messaging subscriber from the plurality of instant messaging subscribers from which the at least one respondent presence status is received;
   storing, in a memory, the association between the first instant messaging subscriber and the at least one of the plurality of instant messaging subscribers from which the at least one respondent presence status is received; and
   broadcasting, in accordance with the association, a subsequent personal presence status from the first instant messaging subscriber only to the at least one instant messaging subscriber from the plurality of instant messaging subscribers from which the at least one respondent presence status is received, wherein only the at least one instant messaging subscriber from the plurality of instant messaging subscribers from which the at least one respondent presence status is received receives the subsequent personal presence status while other instant messaging subscribers from the plurality of instant messaging subscribers from which the at least one respondent presence status is not received do not receive the subsequent personal presence status.

2. The method of claim 1, further comprising:
receiving an updated status for the at least one instant messaging subscriber from the plurality of instant messaging subscribers; and
updating the respondent presence status associated with the at least one instant messaging subscriber from the plurality of instant messaging subscribers in response to the received updated status.

3. The method of claim 1, further comprising storing the at least one respondent presence status associated with the at least one of the plurality of instant messaging subscribers in the memory.

4. The method of claim 3, wherein broadcasting the subsequent personal presence status comprises:
filtering, based on the association between the first instant messaging subscriber and the at least one responded presence status stored in the memory, the plurality of instant messaging subscribers, wherein only the at least one instant messaging subscriber from the plurality of instant messaging subscribers from which the at least one respondent presence status is received is included as a possible recipient of the subsequent personal presence status.

5. The method of claim 1, wherein the personal presence status, the at least one respondent presence status, and the subsequent personal presence status each comprise an online status.

6. The method of claim 1, wherein the personal presence status, the at least one respondent presence status, and the subsequent personal presence status each comprise an availability status.

7. The method of claim 1, wherein broadcasting the personal presence status and sending the request for the respondent presence status occur in response to initiation of the first instant messaging subscriber.

8. The method of claim 7, wherein initiation comprises launching an instant messaging web client.

9. The method of claim 7, wherein initiation comprises user selectable initiation.

10. The method of claim 1, wherein selectively broadcasting subsequent personal presence status comprises broadcasting internet protocol networking messages.

11. The method of claim 1, wherein the at least one respondent presence status is based on a lack of response within a predetermined response period.

12. A system comprising:
a plurality of instant messaging clients each associated with respective instant messaging subscriber from a plurality of instant messaging subscribers;
a plurality of instant messaging servers including one or more processors, wherein the plurality of instant messaging servers are configured to communicate with the plurality of instant messaging clients; and
a memory associated with one or more instant messaging server from the plurality of instant messaging servers,
wherein at least one instant messaging server from the plurality of instant messaging servers includes a presence manager configured to communicate with at least one instant messaging server from the plurality of instant messaging servers, and
wherein the presence manager is configured to receive, from at least one instant messaging subscriber from the plurality of instant messaging subscribers, an associated presence status of one or more instance messaging subscribers from the plurality of instant messaging subscribers, store, in the memory, the associated presence status, and broadcast a respective presence status to only the one or more instant messaging subscribers from the plurality of instant messaging subscribers from which the associated presence status is received, wherein only the one or more instant messaging subscribers from the plurality of instant messaging subscribers from which the associated presence status is received receives the subsequent personal presence status while other instant messaging subscribers from the plurality of instant messaging subscribers from which the associated presence status is not received do not receive the subsequent personal presence status.

13. The system of claim 12, wherein the instant messaging client comprises a web client.

14. The system of claim 12, wherein the instant messaging client comprises a mobile client.

15. The system of claim 12, wherein the presence manager is configured to obtain presence status of the one or more instant messaging subscribers from the plurality of instant messaging subscribers in response to initiation of an instant messaging subscribers from the plurality of instant messaging subscribers.

16. The system of claim 12, wherein the memory comprises a cache.

17. The system of claim 12, wherein at least one instant messaging server of the plurality of instant messaging servers is provisioned as a cloud service.

18. A system comprising:
at least one instant messaging server including one or more processors and a memory; and
a network-enabled communication device in communication with the at least one instant messaging server, wherein the network-enabled communication device is configured to broadcast a personal presence status from a first instant messaging subscriber client to a plurality of instant messaging subscriber clients, wherein a first communication from the first instant messaging subscriber client requests a respective presence status from at least one of the plurality of instant messaging subscriber clients, and wherein at least one responsive communication from the at least one of the plurality of instant messaging subscriber clients provides the respective presence status of the at least one of the plurality of instant messaging subscriber clients,
wherein the at least one instant messaging server is configured to create an association between the first instant messaging subscriber client and the at least one of the plurality of instant messaging subscriber clients from which the responsive communication is received, and broadcast a subsequent personal presence status from the first instant messaging subscriber client to only the at least one of the plurality of instant messaging subscriber clients from which the at least one responsive communication is received receives the subsequent personal presence status while other instant messaging subscriber clients from which the at least one responsive communication is not received do not receive the subsequent personal presence status, and
wherein the association between the first instant messaging subscriber client and the respective presence status from the at least one of the plurality of instant messaging subscriber clients is stored in the memory.

* * * * *